United States Patent
Paine et al.

[15] 3,660,704
[45] May 2, 1972

[54] BALL-SCREW LINEAR ACTUATOR

[72] Inventors: Thomas O. Paine, Administrator of the National Aeronautics and Space Administration with respect to an invention of; Gerald S. Perkins, Altadena, Calif.

[22] Filed: July 31, 1970

[21] Appl. No.: 59,893

[52] U.S. Cl. ................................310/80, 310/83, 310/68
[51] Int. Cl. .........................................................H02k 7/06
[58] Field of Search....................310/80, 83, 75, 72, 154, 12, 310/14, 68

[56] References Cited

UNITED STATES PATENTS

| | | | |
|---|---|---|---|
| 2,860,266 | 11/1958 | Schrader | 310/83 X |
| 3,402,308 | 9/1968 | Henschke | 310/80 |
| 3,173,040 | 3/1965 | Cruzan | 310/83 |
| 2,177,472 | 10/1939 | Barrett | 310/154 |
| 2,956,188 | 10/1960 | White | 310/83 X |

*Primary Examiner*—D. F. Duggan
*Attorney*—J. H. Warden, Monte F. Mott and John R. Manning

[57] ABSTRACT

A compact, linear actuator particularly suited for use aboard a space craft and the like, characterized by an elongated output shaft operatively supported, in an hermetically sealed housing, for rectilinear reciprocation and circumscribed by a ball-screw and nut assembly which operatively is driven through an electrically energizable, reversible motor concentrically coupled with the nut of the ball-screw and nut assembly, whereby selected rectilinear motion is imparted to the shaft as the motor selectively is energized. A particular feature of the actuator resides in the concentricity of the nut and motor which enhances compactness of the actuator and the efficiency of its operation.

7 Claims, 3 Drawing Figures

Patented May 2, 1972

3,660,704

GERALD S. PERKINS
INVENTOR

ATTORNEYS

BALL-SCREW LINEAR ACTUATOR

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

The invention relates to a linear actuator, and more particularly to a compact and lightweight actuator particularly suited for repetitive use in a celestial space environment.

2. Description of the Prior Art

The prior art is replete with linear actuators, including solenoids and gas-driven actuators, as well as actuators which are gear-driven in response to outputs acquired from various types of power units including electrically energizable motors. Such actuators often are employed aboard operative space craft for various purposes, including the positioning of maneuver engines. However, existing actuators have not fully met existing needs since, as is readily apparent, such actuators must be highly reliable, compact, and lightweight, as well as possess rapid, predictable and consistent response characteristics under varying load conditions, particularly where the actuators are employed onboard craft carrying out missions of extended duration.

OBJECTS AND SUMMARY OF THE INVENTION

It therefore is an object of the instant invention to provide an improved linear actuator.

Another object is to provide an improved linear actuator which is compact, lightweight, and which is well suited for repetitive operation over extended periods.

It is another object to provide an improved linear actuator which is highly reliable and possesses predictable output characteristics under varying load conditions over extended periods of operation.

Another object is to provide an improved linear actuator which is particularly suited for use in a celestial space environment for periods of extended duration.

DESCRIPTION OF THE PREFERRED EMBODIMENT

Figures 1, 2, 3:
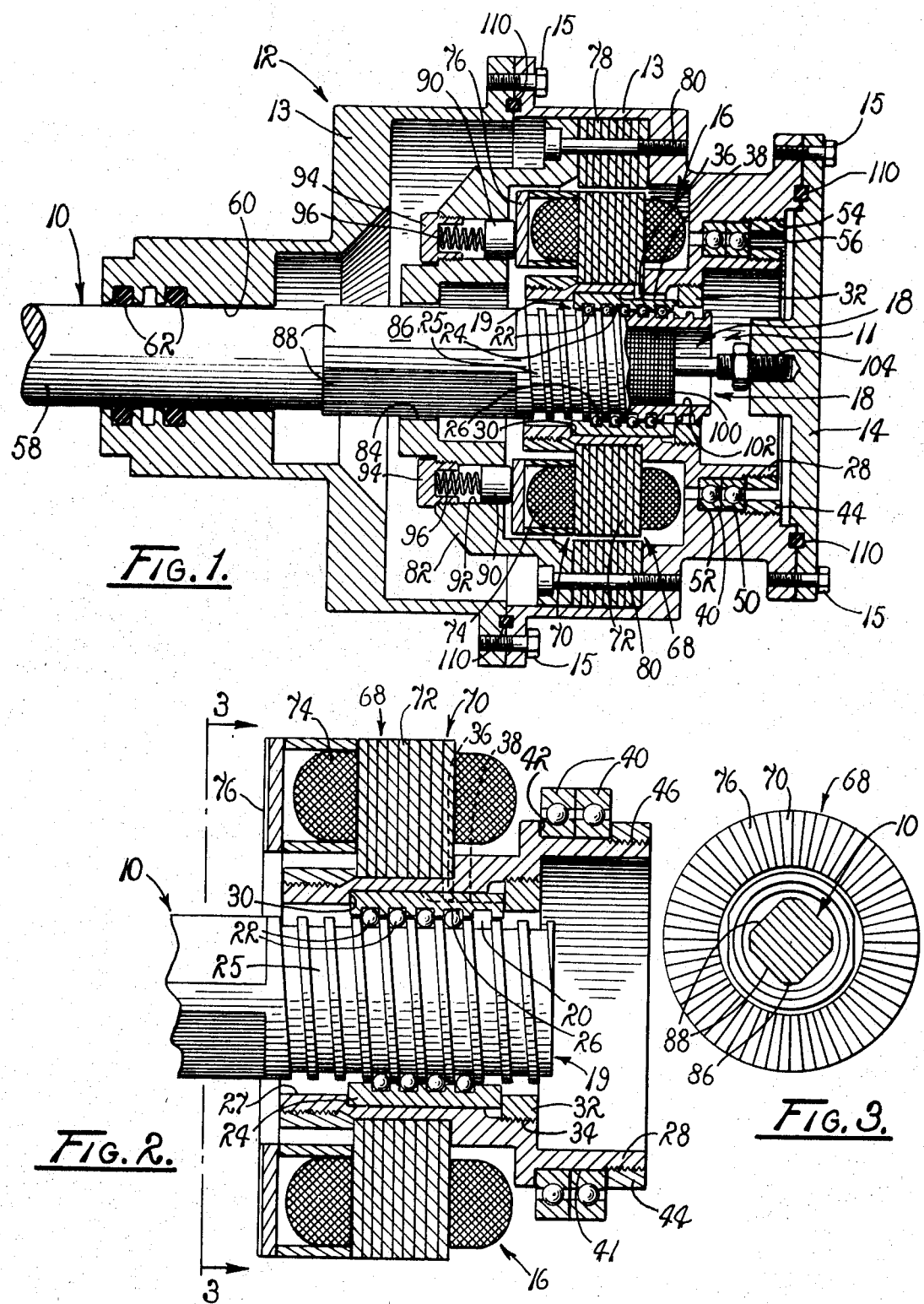
FIG. 1 is a cross-sectional view of a linear actuator which embodies the principles of the instant invention.
FIG. 2 is a partially sectioned, fragmentary view on somewhat of an enlarged scale, of a rotor employed by the actuator of FIG. 1.
FIG. 3 is a partially sectioned view of the rotor, taken along line 3—3 of FIG. 2.

Referring now to the drawings wherein like reference characters designate like or corresponding parts throughout the several views, there is shown in FIG. 1 a cross-sectional view of a linear actuator which embodies the principles of the present invention. The actuator includes a reciprocable, elongated output shaft 10, having a drive coupling 11 supported within a housing 12. The housing 12 is fabricated from housing components, including a pair of mated shells 13 closed by an access cover, hereinafter called an end plate 14. The shells 13 and the end plate 14 are coupled together in engagement by a plurality of studs 15 and received in appropriately arranged screw-threaded openings, not designated. In addition to the shaft 10 and drive coupling 11, there is confined within the housing 12 a motor 16 for driving the coupling 11 and a coaxially related linear transducer 18 which continuously monitors the position of the shaft 10.

As best illustrated in FIG. 2, the drive coupling 11 includes a recirculating ball load screw assembly, hereinafter referred to simply as a ball-screw and nut assembly 19. This assembly is provided with a helicoid ball groove 20, a plurality of ball bearings 22 seated in the groove, and a nut 24 circumscribing and confining the ball bearings within the groove. The ball groove 20 is, in effect, established by a pair of oppositely disposed and matched grooves, including a helical groove 25 extending along the external surface of the body of the shaft 10 and a matching helical groove 26 extending along the internal surface of the nut 24. The groove 20 is so dimensioned as to accommodate a multiplicity of the ball bearings 22 in a manner consistent with known ball-screw and nut assemblies. As is well known, the efficiency of a ball-screw and nut assembly is a function of the screw lead angle. Therefore, the lead angle is maintained at a minimal angle.

While not shown, it is to be understood that there is provided a ball-return for the assembly 19. Where desired, the nut 24 can include a plurality of ball-transfer inserts, of a commercially available design, spaced symmetrically about the nut's circumference for providing a plurality of cross-over paths. In such instances, the inserts establish multiple ball circuits for delivering the ball bearings 22 in a recirculating fashion. Since the structures employed in providing the cross-over paths form no specific part of this invention and are well within the purview of the art, a detailed description is omitted in the interest of brevity.

The nut 24 is mounted concentrically within a bore 27 of an elongated sleeve 28, and is secured therein by an annular shoulder 30 abutting one end thereof while the opposite end of the nut is engaged by a lock-ring 32 having an external screw-thread extended along its surface. The lock-ring 32 threadingly is received within an internally screw-threaded portion 34 of the sleeve 28 and is so disposed relative to the nut 24 that the nut is, in effect, sandwiched between the shoulder 30 and the lock-ring 32. Hence, axial displacement of the nut 24 along the longitudinal axis to the sleeve 28 is precluded.

The nut 24 is secured against rotation relative to the sleeve 28 through a suitable coupling such as a pin 36 radially extended through the wall of the sleeve 28 and received within key-way 38 formed in the external surface of the nut 24. Consequently, any rotation which operatively is imparted to the sleeve 28 also is imposed on the nut 24 through the pin 36. It will be appreciated that while only one coupling pin 36 and key-way 38 is shown, as many coupling pins as is desired can be provided.

The sleeve 28 is supported for rotation, relative to the housing 12, through a pair of adjacent bearing races 40 circumscribing one end thereof. These races are seated in an annular seat 41, provided about the periphery of the sleeve 28 and defined by an annular shoulder 42 and an internally threaded annular lock-ring 44. This lock-ring is seated in an externally threaded, terminal portion 46 of the sleeve 28, while the shoulder 42 is machined or otherwise provided on the external surface of the sleeve. Hence, it can be appreciated that the bearing races 40 are retained against axial displacement in much the same manner as that in which the nut 24 is retained against axial displacement relative to the sleeve 28.

The bearing races 40 also are received by an annular bearing surface 50 machined or otherwise provided in the housing 12. This bearing surface is defined between an annular shoulder 52 and a screw-threaded surface 54. An externally threaded lock-ring 56 is received within the threaded surface 54 and is advanced into engagement with the bearing races 40 for securing the races against axial displacement relative to the housing 12, in a manner similar to that in which the races 40 are secured against axial displacement relative to the sleeve 28.

With particular reference to FIG. 1, the shaft 10 includes a distal portion 58 extended through an axial opening 60 formed at one end of the housing 12. While not shown, it is to be understood that the distal portion 58 of the shaft 10 serves to couple the actuator with selected mechanical linkages. The opening 60, through which the shaft is extended, is surfaced in a manner such as to provide a plain bearing support for the shaft 10, whereby the shaft is restrained against radial motion while axial motion of the shaft readily is accommodated. It should readily be apparent that since the shaft 10 and the sleeve 28 integrally are coupled through the ball-screw and nut assembly 19 the sleeve 28 is supported by the bearing surface 50 and by the shaft 10 as it extends through the opening 60. Where desired, a plurality of O-ring seals 62 can be seated in appropriate grooves formed within the opening 60 and employed in establishing an hermetic seal along the surface of the shaft 10 for assisting in hermetically sealing the housing 12.

The motor 16 includes a rotor 68, of a toroidal configuration, including a wound armature 70. Because of the inherent power torque characteristics, the motor 16 is designed to function as a reversible D.C. motor. Therefore, the armature 70 is provided with a rotor mass including a plurality of laminated disks 72, as well as with armature windings 74 mounted on the sleeve 28 and electrically coupled with a segmented commutator 76 of an annular configuration disposed in a plane normally related to the sleeve 28. A permanent magnet stator 78 substantially of an annular configuration circumscribes the armature and is secured in place through an array of a plurality of coupling pins 80 threadingly received within suitable openings formed in transverse surfaces of the housing 12.

As a practical matter, the pins 80 further serve to support a bell housing 82 having a concentric opening 84 conforming to a polygonal configuration through which is extended the shaft 10. The opening 84 receives therein a torque restraining portion 86 of the shaft 10 so configured as to include a plurality of angularly related flats 88 extending along the surface of the shaft. Hence, as can readily be appreciated, axial reciprocation of the shaft 10, relative to the bell housing 82, is accommodated while rotation about its own axis is precluded due to the rotation inhibiting functions of the portion 86.

The bell housing 82 also serves as a mount for an annular array of suitable brushes 90 operatively associated with the segmented commutator 76 in a manner consistent with design principles of D.C. motors. The brushes 90 are inserted into tubular openings 92 formed in the bell housing 82 and so disposed as to bring the brushes 90 into operative engagement with the segments of the commutator 76. As a practical matter, the brushes 90 are secured in an operative disposition employing screw-threaded plugs 94 and compression springs 96 for assuring that a continuous engagement of the brushes 90 with the commutator 76 is maintained.

The brushes 90 operatively are coupled with a suitable source of D.C. potential, not shown, in order to achieve an electrical energization of the coil windings 74 for imposing rotation on the nut 24, whereby as the nut 24 is afforded rotation the ball bearings 22 act to impart axial displacement to the shaft 10. The direction of rotation thus imparted to the nut 24 and, consequently, the direction of the resulting shaft displacement is dictated by the direction of the flow of current established through the coil windings.

The extent of axial displacement achieved as a consequence of the imposed rotation of the nut 24 is detected through the transducer 18 which continuously monitors the shaft 10. The transducer 18 is, in practice, a linear motion transducer. Since such devices commercially are available, a detailed description is omitted in the interest of brevity. However, it is to be understood that the transducer preferably includes a variable differential transformer winding 100 seated within an axial bore 102 extended into the end of the shaft 10. The transformer winding concentrically is related to the ball-screw and nut assembly 19 and is mounted in a manner such that the windings are displaced relative to the housing 12 as axial motion is imparted to the shaft 10. As a practical matter, a soft iron slug 104 coaxially is received and threadingly mounted within the end plate 14 of the housing 12. The slug extends as a probe into the transformer whereby as linear motion is imparted to the shaft 10, such motion is detected and measured by changes in the acquired voltage output. Suitable electrical leads, not shown, couple the transducer to detection and telemetry circuits, also not shown, whereby the output of the actuator constantly is monitored.

It is important to note that the linear actuator embodying the principles of the present invention often is employed in a celestial space environment, therefore, it often is preferred that the actuator be hermetically sealed. To achieve this sealing, suitable O-ring seals 110 are disposed between mated surfaces of the housing components and are utilized in achieving an hermetic seal as the housing components are brought into a face-to-face and mated relationship. It is to be understood that the environment in which the actuator is employed tends to dictate the desirability of achieving an hermetic seal for the housing 12 as gas pressurization of the housing 12 permits a use of convenient lubricants as well as affording protection for the various brushes and bearings in the vacuum of celestial space.

OPERATION

It is believed that in view of the foregoing description, the operation of the device readily will be understood, and it will be briefly reviewed at this point. With the hereinbefore disclosed actuator assembled in the manner aforedescribed, it will be understood that a D.C. potential, applied across the coil windings 74, through the brushes 90 acting on the commutator 76, serves to energize the motor 16 for imposing rotation on the rotor 68. The direction of flow for the electrical current flow established through the coils serves to dictate the direction in which the rotor 68 is driven. However, regardless of direction of rotation, as the rotor 68 is driven, the nut 24 of the ball-screw and nut assembly 19 also is driven in rotation. Such rotation causes the balls 22 serially to advance along the ball groove 20 for thereby imparting axial advancement of the shaft 10. As axial advancement, in directions determined by the direction of current flow, is imparted to the shaft 10, the transducer 18 continuously monitors the position of the shaft and provides an electrical signal indicative of the extent of such advancement. Consequently, the instant position of the shaft 10, as well as its associated linkages, can accurately be detected and relayed through given telemetry circuits. Of course, as should readily be apparent, by reversing the direction of current flowing through the windings 74 a reversal in the direction of advancement of the shaft 10 operatively is achieved.

In view of the foregoing, it should readily be apparent that the instant invention provides an improved and simplified linear actuator, which results in improved actuator performance while employing structure particularly effective in reducing size and weight of operative payloads in a celestial space environment.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. An improved linear actuator comprising:
  A. an axially reciprocable output shaft operatively supported for rectilinear reciprocation;
  B. means for imparting linear motion to the shaft including a ball-screw and nut assembly comprising means defining a ball groove extended along a selected surface portion of the shaft, a nut including means defining therein an internal ball groove, seated in a rotatable sleeve and concentrically related to said shaft, and a plurality of balls seated in said grooves coupling said nut with said shaft in a manner such that linear motion is imparted to said shaft through said balls as rotation is imposed on said nut;
  C. an electrically energizable motor circumscribing the nut and operatively coupled therewith for imposing rotation thereon, for thereby imparting linear motion to said shaft; and D. a linear motion transducer operatively associated with said shaft for monitoring linear motion imparted thereto, comprising means defining within one end of said shaft a tubular housing, a variable differential transformer seated in said housing, and a transducer probe coaxially related to said transformer and operatively associated with said shaft in a manner such that as the shaft is reciprocated, relative displacement between said shaft and said probe is achieved.

2. The actuator of claim 1 wherein said electrically energizable motor includes a permanent magnet stator of an annular configuration radially spaced from said ball-screw and nut assembly.

3. The actuator of claim 2 wherein said motor includes armature windings mounted on said sleeve.

4. The actuator of claim 3 wherein said motor further includes a segmented commutator of an annular configuration and an annular array of brushes operatively associated therewith.

5. The actuator of claim 4 further including an hermetically sealed housing confining said motor and said ball-screw and nut assembly.

6. An improved linear actuator comprising:
A. an hermetically sealed housing;
B. an elongated tubular sleeve concentrically arranged within said housing and operatively supported for rotation about a longitudinal axis of symmetry;
C. an axially reciprocable output shaft extended through said sleeve and projected from said housing;
D. means supporting said shaft including
   a. a ball-screw and nut assembly, including an annular nut, circumscribing a first end portion of the shaft for driving the shaft in axial advancement as the nut is driven in rotation,
   b. means fixedly mounting said nut within said sleeve in a concentric relationship therewith,
   c. a plane bearing support operatively supporting a second end portion of said shaft, and
   d. means disposed within said housing for restraining said shaft from rotation about its longitudinal axis of symmetry;
E. means defining an electrically energizable motor circumscribing said sleeve and radially spaced from said nut for imparting rotation to the sleeve, whereby said shaft is driven in axial advancement; and
F. a linear motion transducer operatively associated with said shaft adapted continuously to monitor the position of said shaft.

7. The actuator of claim 6 wherein said means defining said electrically energizable motor includes:
A. a permanent magnet stator of an annular configuration fixedly coupled to said housing;
B. a rotor operatively fixed to said sleeve including a wound armature coupled with a segmented commutator of an annular configuration concentric to said axis of symmetry; and
C. a plurality of brushes disposed in an annular array adapted to engage said commutator.

* * * * *